US005654501A

United States Patent [19]

Grizzle et al.

[11] Patent Number: 5,654,501

[45] Date of Patent: Aug. 5, 1997

[54] ENGINE CONTROLLER WITH AIR METER COMPENSATION

[75] Inventors: Jessy W. Grizzle, Ann Arbor; Jeffrey Arthur Cook, Dearborn, both of Mich.

[73] Assignee: Ford Motor Company, Dearborn, Mich.

[21] Appl. No.: 643,976

[22] Filed: May 7, 1996

Related U.S. Application Data

[63] Continuation of Ser. No. 413,323, Mar. 30, 1995, abandoned.

[51] Int. Cl.[6] .......... G01M 15/00; F02M 51/00

[52] U.S. Cl. .......... 73/118.2; 73/117.3; 123/435; 364/431.01

[58] Field of Search .......... 73/116, 117.2, 73/117.3, 118.1, 118.2, 865.9; 123/435; 364/431.01, 431.03

[56] References Cited

U.S. PATENT DOCUMENTS

| | | | |
|---|---|---|---|
| 4,125,015 | 11/1978 | DiNunzio et al. | 73/118.2 |
| 4,403,505 | 9/1983 | Hattori et al. | 73/117.3 |
| 4,644,784 | 2/1987 | Okano et al. | 73/117.3 |
| 4,761,994 | 8/1988 | Sogawa | 73/118.2 |
| 4,836,015 | 6/1989 | Krage | 73/117.2 |
| 4,913,118 | 4/1990 | Watanabe | 73/117.3 |
| 5,008,824 | 4/1991 | Clark et al. | 73/118.2 |
| 5,270,935 | 12/1993 | Dudek et al. | 73/117.3 |
| 5,359,883 | 11/1994 | Baldwin et al. | 73/117.3 |
| 5,398,544 | 3/1995 | Lipinski et al. | 73/118.2 |

OTHER PUBLICATIONS

P.E. Moral., J.W. Grizzle and J.A. Cook, "An Observer Design for Single–Sensor Individual Cylinder Pressure Control", *Proceedings of the IEEE Conference on Decision and Control*, San Antonio, Dec., 1993, pp. 2922–2961.

B.K. Powell and J.A. Cook, "Nonlinear Low Frequency Phenomenological Engine Modeling and Analysis", *Proc.* 1987 *Amer. Contr. Conf.*, vol. 1, pp. 332–340, Jun. 1987.

*Primary Examiner*—George M. Dombroske
*Attorney, Agent, or Firm*—Allen J. Lippa

[57] ABSTRACT

An electronic engine controller (EEC) for an internal combustion engine develops an estimate of air charge by receiving a signal from an air meter positioned in an intake manifold of the engine. The signal is indicative of mass flow rate of air past the meter. In one embodiment EEC develops an air charge estimate by developing a first pressure value which is indicative of the pressure in the intake manifold. A pressure correction term is then generated and added to the first pressure value to generate an improved estimate, which takes the dynamic response of the air meter into account, of pressure in the intake manifold. The air charge estimate is then developed from the pressure estimate. In another embodiment, a first mass value, which is indicative of the mass of air in the intake manifold is developed. A mass correction term is then generated and added to the first mass value to generate the improved estimate.

15 Claims, 5 Drawing Sheets

ENGINE CONTROLLER WITH AIR METER COMPENSATION

This application is a continuation of application Ser. No. 08/413,323 filed Mar. 30, 1995, now abandoned.

FIELD OF THE INVENTION

This invention relates to the field of electronic engine control and more particularly to techniques for compensating for dynamic characteristics of an air flow meter in an internal combustion engine.

BACKGROUND OF THE INVENTION

In modern automobiles, precise control of air-fuel ratio (A/F) to a stoichiometric value is necessary for optimum performance of the three-way catalytic converter (TWC) and consequent minimization of exhaust emissions. A/F control generally consists of two components: a feedback portion in which a signal related to A/F from an exhaust gas oxygen (EGO) sensor is fed back through a digital controller to regulate the fuel injection pulse width, and a feed forward portion in which injector fuel flow is controlled in response to a signal from an air flow meter. The feedback, or closed-loop portion of the control system, is fully effective only under steady state conditions and when the EGO sensor has attained the proper operating temperature. The open-loop, or feed forward portion of the control system, is particularly important when the engine is cold (before the closed-loop A/F control is operational) and during transient operation when inherent delays in the closed-loop A/F feedback system inhibits good control. Typically, the signal from the air flow meter is used to generate an estimate of instantaneous manifold pressure. This estimate along with engine speed and, potentially, other engine variables, such as EGR, vapor purge, etc., defines the flow rate of air into the engine cylinders from the manifold. Finally, cylinder air charge is determined by integrating the cylinder flow rate of air over the time required for the engine to complete one intake stroke. The cylinder air charge divided by the stoichiometric A/F ratio is the amount of fuel required for operation at stoichiometry and is used to calculate the appropriate injector pulse width.

The inventors herein have recognized two deficiencies with the conventional scheme. First, in order to provide an accurate dynamic estimate of the air flow entering the engine, it is essential to modify the air meter signal to account for the dynamic characteristics of the meter itself. The signal from the air meter does not respond instantaneously to changes in air flow. Hence, the conventional method of calculating manifold pressure and thus cylinder air charge on the basis of this uncorrected signal under estimates the amount of air in the intake manifold when the true air flow increases, and over estimates it in the case of a decrease in true air flow. Secondly, known methods of accounting for air meter dynamics require differentiating the electronic signal from the air meter. This approach results in undesirable noise amplification.

SUMMARY OF THE INVENTION

It is an object of the present invention to improve A/F control in an internal combustion engine by compensating for the dynamic response characteristics of an air meter in order to generate an improved indication of cylinder air charge.

In accordance with the primary object of the invention, an electronic engine controller employs a means which is responsive to a signal from an air meter positioned to be exposed to air entering an intake manifold of an engine. The air meter generates a measured air flow value which is indicative of the mass flow rate of air entering the intake manifold. A base pressure value, which is indicative of an air pressure in the intake manifold which corresponds to the measured air flow value is generated as a function of the measured air flow value. A pressure correction value is generated as a function of the measured air flow value, a prior measured air flow value, and a prior pressure correction value; the pressure correction value being indicative of dynamic response of the air meter. A total pressure value which is indicative of the total pressure in the intake manifold is generated as a function of a base pressure value and the pressure correction value. A cylinder air charge value, which is indicative of air charge in cylinders of the engine is then generated as a function of the total pressure value, the rotational speed of the engine and a sampling interval which is indicative of a rate at which the measured air flow value is generated.

In another aspect of the invention, a mass charge estimate is utilized instead of a pressure charge estimate, as represented by the total pressure value, described above.

An advantage of certain preferred embodiments is that an accurate air charge estimate is generated which takes the dynamic characteristics of the air meter into account. Air-fuel control is thus improved. An additional advantage is that only a single measurement device, such as the air meter, is utilized to provide the accurate air charge estimate. A throttle position sensor or a manifold pressure sensor is not required. Hence, cost is decreased and reliability is improved. In addition, the air charge estimate is generated without explicitly differentiating the signal generated by the air meter. Thus noise which may exist in the air meter signal is not amplified as a result of differentiation of the signal.

These and other features and advantages of the present invention may be better understood by considering the following detailed description of a preferred embodiment of the invention. In the course of this description, reference will frequently be made to the attached drawings.

DETAILED DESCRIPTION

Figure 1:
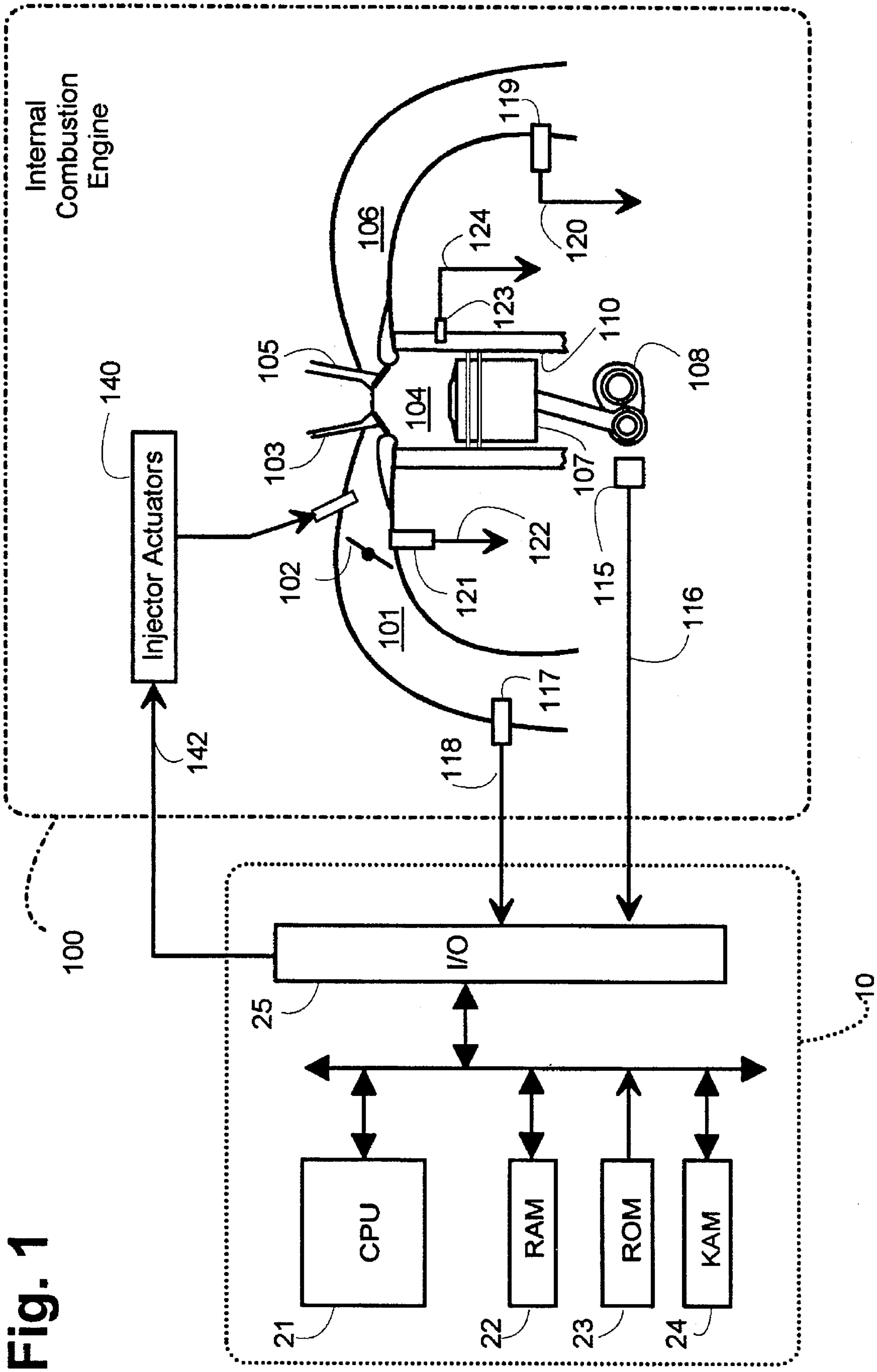
FIG. 1 of the drawings shows a schematic diagram of a preferred embodiment of portions of an internal combustion engine and an electronic engine controller which utilizes the principles of the invention.

FIG. 1 of the drawings shows an Electronic Engine Controller (EEC) 10 and an internal combustion engine 100. Engine 100 draws an aircharge through an intake manifold 101, past a throttle plate 102, an intake valve 103 and into combustion chamber 104. An air/fuel mixture which consists of the aircharge and fuel, is ignited in combustion chamber 104, and exhaust gas produced from combustion of the air/fuel mixture is transported past exhaust valve 105 through exhaust manifold 106. A piston 107 is coupled to a crankshaft 108, and moves in a reciprocating fashion within a cylinder defined by cylinder walls 110.

A crankshaft position sensor 115 detects the rotation of crankshaft 108 and transmits a crankshaft position signal 116 to EEC 10. Crankshaft position signal 116 preferably takes the form of a series of pulses, each pulse being caused by the rotation of a predetermined point on the crankshaft past sensor 115. The frequency of pulses on the crankshaft position signal 116 are thus indicative of the rotational speed of the engine crankshaft. A Mass AirFlow (MAF) sensor 117 detects the mass flow rate of air into intake manifold 101 and transmits a representative air meter signal 118 to EEC 10. MAF sensor 117 preferably takes the form of a hot wire air meter. A Heated Exhaust Gas Oxygen (HEGO) sensor 119 detects the concentration of oxygen in exhaust gas produced by the engine and transmits an exhaust gas composition signal 120 to EEC 10 which is indicative of the composition of the exhaust gas. A throttle position sensor 121 detects the angular position of throttle plate 102 and transmits a representative signal 122 to EEC 10. Throttle position sensor 121 preferably takes the form of a rotary potentiometer. An engine coolant temperature sensor 123 detects the temperature of engine coolant circulating within the engine and transmits an engine coolant temperature signal 124 to EEC 10. Engine coolant temperature sensor 123 preferably takes the form of a thermocouple.

Injector actuators 140 operate in response to fuel injector signal 142 to deliver an amount of fuel determined by fuel injector signal 142 to combustion chambers 104 of the engine. EEC 10 includes a central processing unit (CPU) 21 for executing stored control programs, a random-access memory (RAM) 22 for temporary data storage, a read-only memory (ROM) 23 for storing the control programs, a keep-alive-memory (KAM) 24 for storing learned values, a conventional data bus, and I/O ports 25 for transmitting and receiving signals to and from the engine 100 and other systems in the vehicle.

Figure 2:
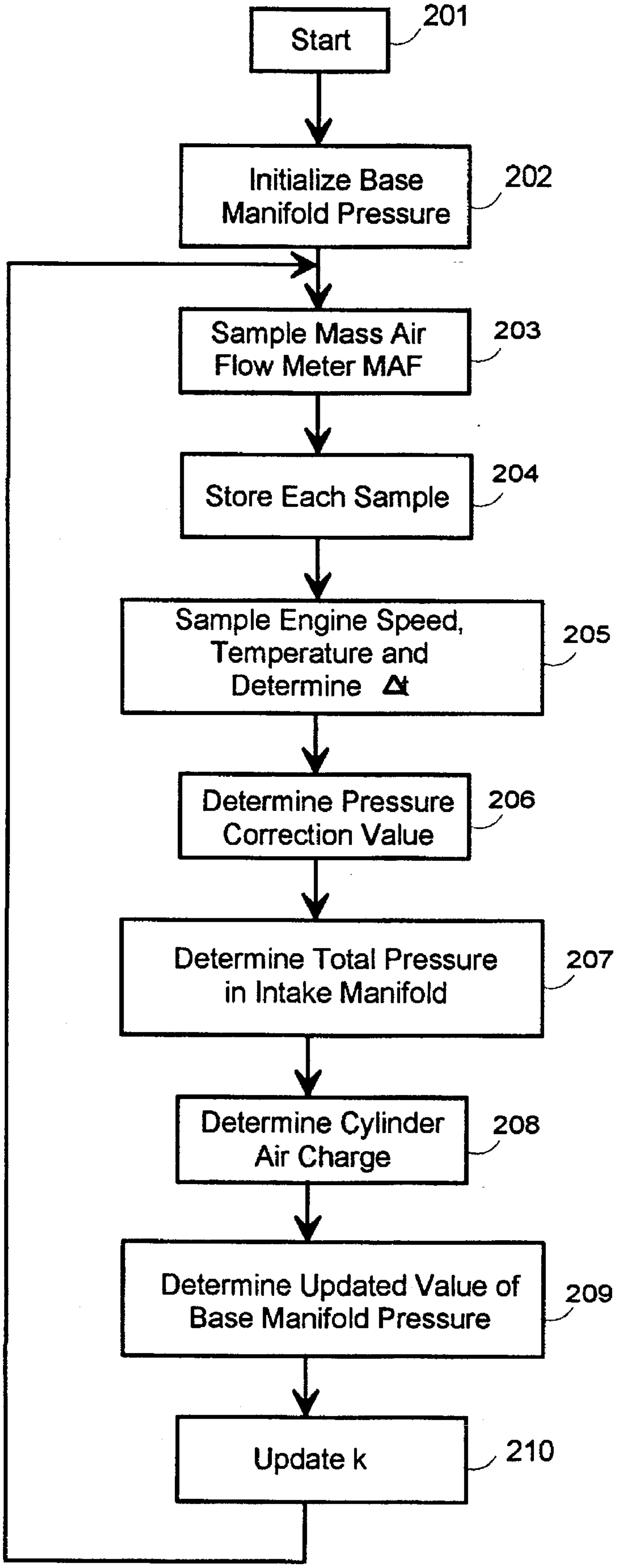
FIGS. 2 and 3 are flowcharts showing the operation of preferred embodiments.
Figure 3:
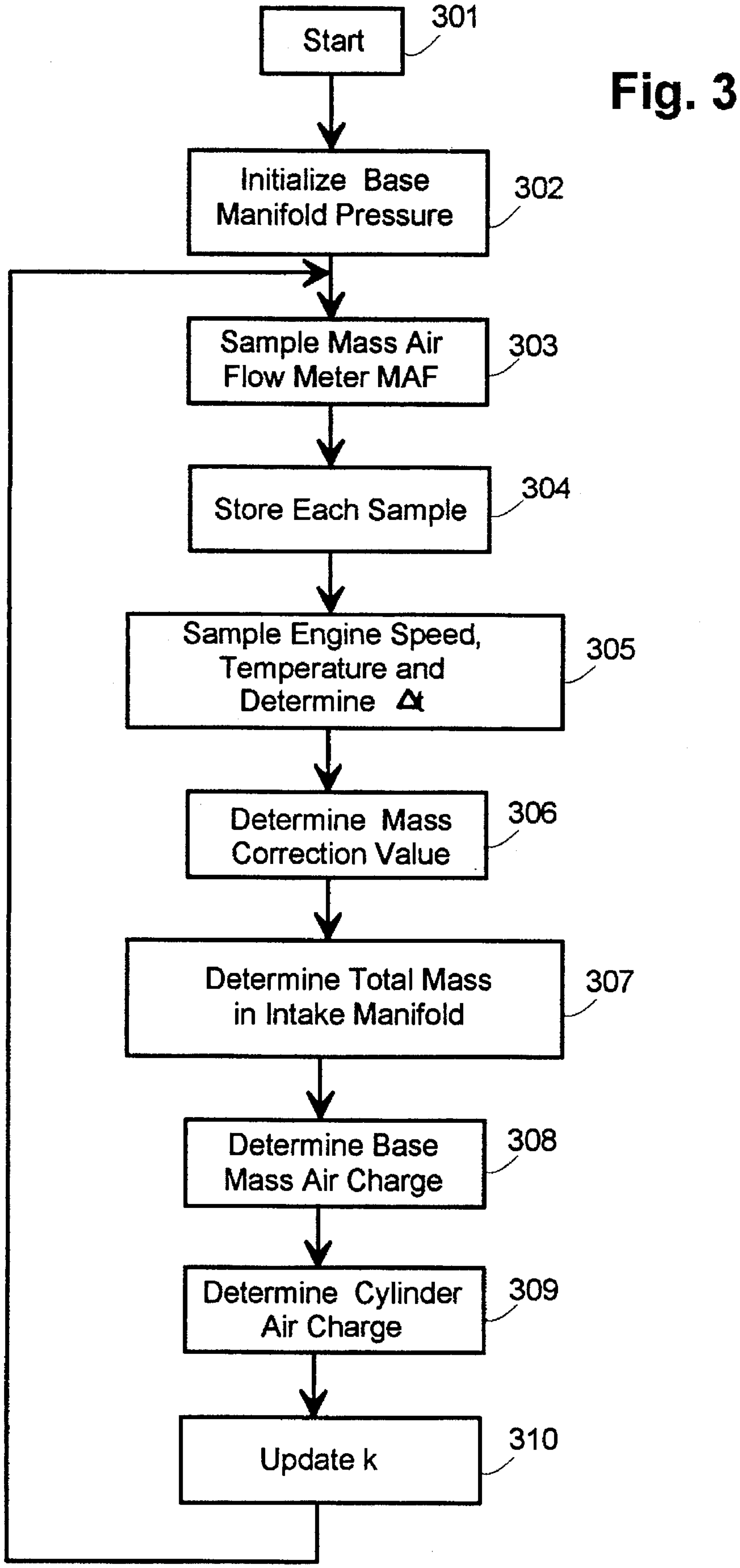

A preferred embodiment of EEC 10 advantageously controls engine operation in a manner which compensates for dynamic characteristics of the air meter 117 in order to improve accuracy in air/fuel control. FIGS. 2 and 3 are flowcharts showing the steps executed by a preferred embodiment to implement two alternative methods for compensating for dynamic characteristics of air meter 117. The steps shown in FIGS. 2 and 3 are preferably implemented as programs stored in ROM 23 and executed by CPU 21 as a part of an interrupt driven routine during all phases of engine operation. Alternatively, the steps shown in FIGS. 2 and 3 may only be executed during certain phases of engine operation, particularly during transient operation where deficiencies in the dynamic characteristics of the air meter 117 may be most prevalent.

FIG. 2 shows the steps executed to implement a preferred pressure correction routine in which a correction term is utilized to correct a calculated manifold pressure to account for additional manifold pressure due to air which has entered the intake manifold, contributing to its total pressure, but which is not reflected in the air meter signal 118 as a result of dynamic delays in the air meter 117.

The pressure correction routine is entered at 201 and at step 202 a base manifold pressure value, designated herein as "x" is initialized. A routine identification value, designated herein as k, is also initialized at 202. The routine identification value k is utilized to indicate the relative point in time at which values are generated by the pressure correction routine. Step 202 is preferably executed once each time the engine is started. Consequently, depending upon storage capacity of the EEC 10, values generated upon numerous executions of the pressure correction routine may be stored and uniquely identified.

At steps 203 and 204 the air meter signal 118 is sampled and stored as a value, designated herein as a Mass AirFlow (MAF) value, in memory. Preferably a plurality of MAF values, representing sensed mass air flow rates at different points in time are maintained in memory. As used herein, each of the stored MAF values is designated with a subscript to differentiate the relative point in time indicated by each of the values. For example, the value $MAF_k$ contains a value indicative of the air flow rate sampled on the current execution of the pressure correction routine, and the value $MAF_{k-1}$ contains a value indicative of the air flow rate sampled on the prior execution of the pressure correction routine.

At step 205, a plurality of additional signals, each indicative of a different engine operating parameter, are sampled and stored. Specifically, crankshaft position signal 116 is sampled and stored as a value, designated herein as engine speed value N; and engine coolant temperature signal 124 is sampled and stored as a value designated herein as engine temperature value T. In addition, at step 205 a sampling interval value ΔT is determined. The sampling interval value ΔT is indicative of a time interval elapsed between a sampling by EEC 10 of the air meter signal 118 and a subsequent sampling by EEC 10 of the air meter signal 118. Because the air meter signal 118 is sampled upon each execution of the pressure correction routine, the sampling interval value ΔT is also indicative of the amount of time elapsed between execution of the pressure correction routine and subsequent execution of the pressure correction routine.

At step 206, a pressure correction value $\Delta P_k$, which is indicative of a pressure correction required to compensate for dynamic characteristics of the air meter 117 is determined. The base manifold pressure value x indicates an air pressure corresponding to the mass flow rate of air past air meter 117. The pressure correction value advantageously compensates for errors introduced into generation of the base mass air flow value by the dynamics of the air meter. For example, rapid changes in the air flow rate may be detected with varying degrees of accuracy depending upon the type of air meter used. In addition, heat transfer between the air meter and the air flowing past the meter may also affect the accuracy of the air flow meter output. If the air meter is described by a first order linear differential equation, such as that shown in equation (1) below, then the pressure correction value $\Delta P_k$ is preferably determined in accordance with the relationship shown in equation (2).

$$\tau\left(\frac{dMAF}{dt}\right) + MAF = MAF_a \tag{1}$$

$$\Delta P = \left(\frac{RT\tau}{V_m}\right) MAF \tag{2}$$

where,

ΔP is as described above,

R is the universal gas constant,

T is the temperature of the air in the intake manifold, $V_m$ is the volume of the intake manifold, MAF is as described above, $MAF_a$ is the actual mass air flow through the intake manifold, and τ is the time constant of the air meter.

Generation of the pressure correction term ΔP in accordance with the relationship expressed in equation (2) may preferably be performed either by accessing a look-up table stored in memory which contains a plurality of pressure correction terms indexed by the current MAF value ($MAF_k$)

and the prior mass air flow ($MAF_{k-1}$), or may preferably be performed by performing a series of calculations which approximates the relation expressed in equation (2). If a look-up table is utilized, the table may take a variable number of dimensions depending upon how the air meter response is modelled. The pressure correction term may take the following general form:

$$\Delta P_k = f(MAF_k, \ldots, MAF_{k-j+1}, P_{k-1}, \ldots, P_{k-r}) \quad (3)$$

where, $MAF_k$ and $MAF_{k-j+1}$ are the MAF values obtained upon different executions of the pressure correction routine, and $P_{k-1}$ and $P_{k-r}$ are the total pressure values obtained upon different executions of the pressure correction routine.

The values "j" and "r" as used above are indices which express the number of samples required to develop the pressure correction term. For instance, if the values "j" and "r" are "2" and "1" respectively, the pressure correction term will be represented as a function of samples $MAF_k$, $MAF_{k-1}$, and $P_{k-1}$. In such a case, only the present and immediately prior MAF values and the prior pressure value are utilized in determining the pressure correction term $\Delta P_k$. The structure of the pressure correction function may be determined by comparison of measured and calculated pressure, or may be analytically developed as illustrated in equations (1) and (2).

At 207, the base manifold pressure $x_k$ is generated as a function of the MAF value by integrating the mass air flow signal and applying the ideal gas law. A total pressure value, designated herein as $P_k$ is then generated by adding the current base manifold pressure $x_k$ to the pressure correction term $\Delta P_k$. Upon the initial execution of the routine described in FIG. 2, the value of the base manifold pressure is initialized at step 201. An appropriate initial value is preferably an estimate of the atmospheric pressure. Subsequent values of the base pressure will be determined in step 209. The total pressure value $P_k$ is indicative of air pressure in the intake manifold. This value advantageously takes into account the dynamic characteristics of the air meter.

At 208, a cylinder air charge value, designated herein as $CAC_k$, which is indicative of air charge in cylinders of the engine is determined in accordance with sampling interval value $\Delta T_k$ and a pumping flow function, designated below as $Cyl(N_k, P_k)$. Specifically, the cylinder air charge value is determined according to the relationship expressed below:

$$CAC_k = \Delta t_k * Cyl(N_k, P_k) \quad (4)$$

where,

*$\Delta_k$ is the interval of time elapsed between the sampling of the current MAF value and the sampling of the prior MAF value,*

$N_k$ is the rotational speed of the engine, $P_k$ is the total pressure value, and $Cyl(N_k, P_k)$ is the pumping flow function which relates the mass of air pumped into engine cylinders from the intake manifold with respect to one or more engine operating variables including engine speed, and other variables which affect engine pumping flow, such as intake valve camshaft position in the case of a variable cam timing engine, or number of active cylinders in the case of a variable displacement engine.

At 209, an updated value of the base manifold pressure is determined for use in the subsequent execution of the pressure correction routine. The updated value is preferably generated according to the following relationship:

$$x_{k+1} = x_k + \Delta t_k * \frac{RT_k}{V} * [MAF_k - Cyl(N_k, P_k)] \quad (5)$$

where, $x_{k+1}$ is the updated value of the base manifold pressure, $x_k$ is the present value of the base manifold pressure, V is the volume of the intake manifold, $\Delta t_k$, R, $T_k$, $MAF_k$ are as described above, and $Cyl(N_k, P_k)$ is as described above.

It will be noted that in equation (5), the base pressure is updated by evaluating the derivative of the perfect gas law expressed in terms of the base pressure and pumping flow function, including the pressure correction term. In equation (5), this is performed via Euler integration. Other discrete integration techniques are equally appropriate.

At 210, the routine identification value k is updated and the EEC performs other engine control functions including determination of an amount of fuel to be injected in accordance with the cylinder air charge determined at step 208. When pressure correction routine is subsequently executed, the execution begins at step 203, unless the engine is turned off, in which case execution begins at step 201.

FIG. 3 of the drawings shows the steps executed in a mass correction routine which may be used as an alternative to the pressure correction routine shown in FIG. 2 to determine cylinder air charge. The routines shown and described in FIGS. 2 and 3 may be considered equivalent, insofar as mass and pressure of a gas are linearly related.

Steps 301–305 of FIG. 3 are identical to steps 201–205, and the description accompanying steps 201–205 should be considered to apply to steps 301–305. At step 306, a mass correction value, designated herein as $\Delta M_k$, which is indicative of the additional mass of air which has entered the intake manifold, but which has not yet been reflected in signal 118 due to the dynamic characteristics of the air meter, is determined. If the air meter is described by a first order linear differential equation, such as that shown in equation (1) above, then the mass correction value $\Delta M_k$ is preferably determined in accordance with the relationship shown in equation (6) below:

$$\Delta M_k = \tau * MAF_k \quad (6)$$

At step 307, a total mass value, designated herein as $M_{tb,k}$, indicative of the total mass in the intake manifold, is generated by adding the mass correction value to an observed mass charge value as shown in equation (7) below:

$$M_{tb,k} = \Delta t_k MAF_k + \Delta M_k \quad (7)$$

where, $\Delta t_k MAF_k$ is the observed mass charge value which is indicative of mass charge at any given point in the intake manifold.

At step 308, a base mass air charge value, designated herein as $\gamma_k$, is determined as a function of air temperature in the intake manifold ($T_k$), the interval of time elapsed between the sampling of the current MAF value and the sampling of the prior MAF value ($\Delta t_k$), the rotational speed of the engine ($N_k$), and the cylinder air charge as calculated on the previous execution of the routine ($CAC_{k-1}$), as seen in equation (8) below:

$$\gamma_k = g(T_k, \Delta t_k, N_k, CAC_{k-1}) \quad (8)$$

In a preferred embodiment, the function shown generally in equation (8) may take a form as shown below:

$$\gamma_k = \Delta t_k * \left( \frac{RT_k}{V} \right) * b(N_k) \quad (9)$$

where, $b(N_k)$ is the partial derivative of the mass flow rate of air into the cylinder with respect to manifold pressure.

At 309, a cylinder air charge value, $CAC_k$, is generated as a function of the base mass air charge value ($\gamma_k$), a prior cylinder air charge value ($CAC_{k-1}$), and the total mass value ($M_{tb,\ k}$) as shown in equation (10) below:

$$CAC_k=(1-\gamma_k)CAC_{k-1}+\gamma_k M_{tb,k} \quad (10)$$

At 310, the routine identification value k is updated and the EEC performs other engine control functions including determination of an amount of fuel to be injected in accordance with the cylinder air charge determined at step 309. When the mass correction routine is subsequently executed, the execution begins at step 303, unless the engine is turned off, in which case execution begins at step 301.

Figure 4:
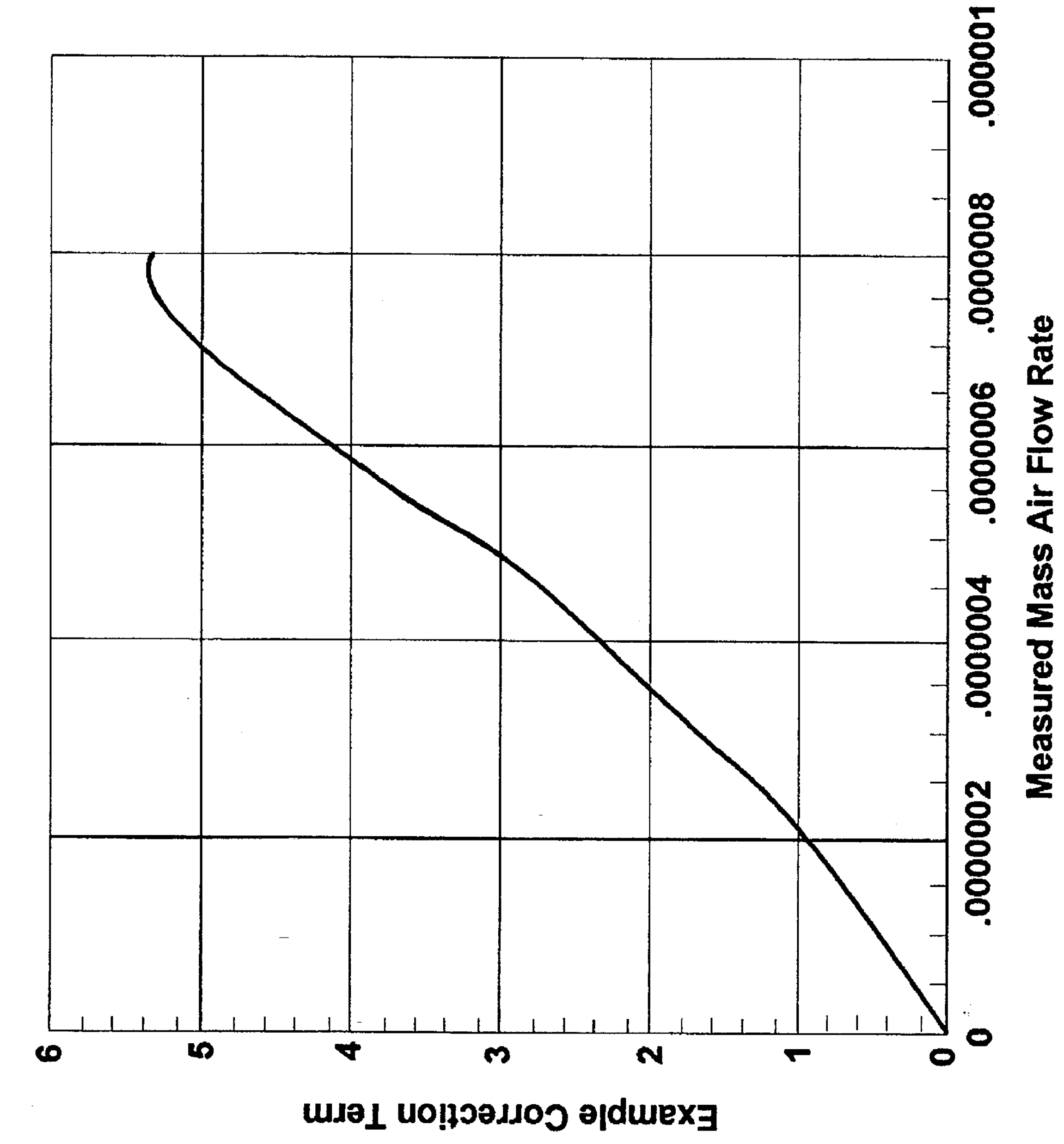
FIGS. 4 is a graph showing the relationship between different variables in a preferred embodiment.
Figure 5:
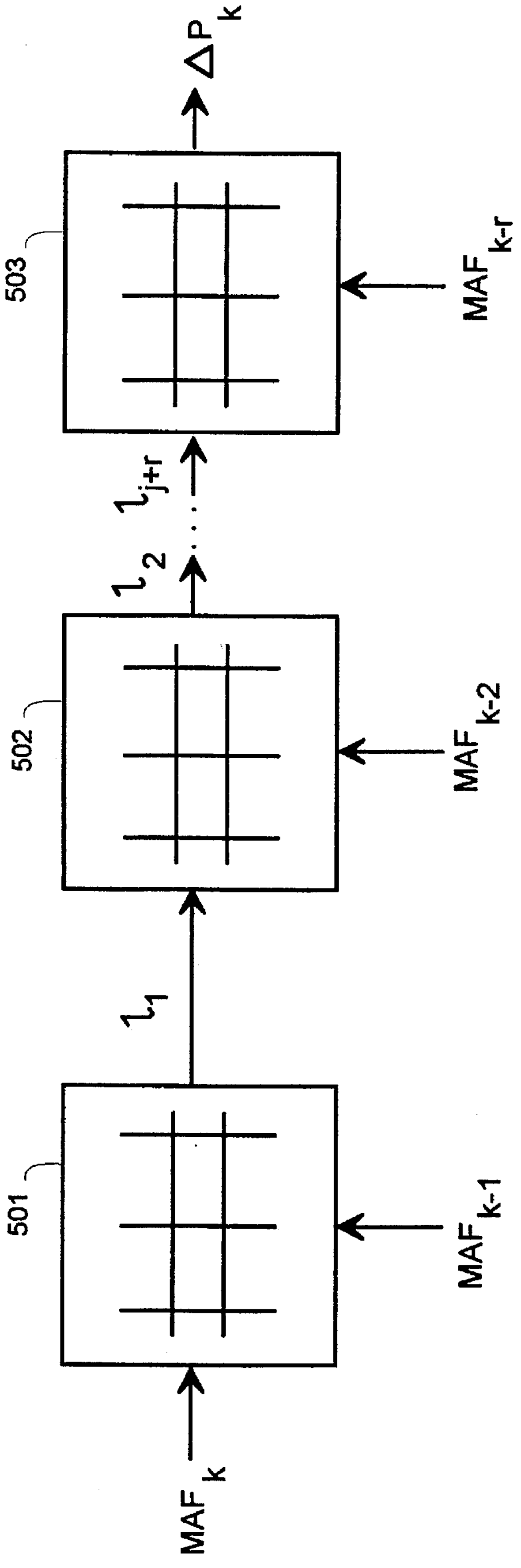
FIG. 5 is a schematic diagram showing a preferred implementation of a function within the electronic engine controller of FIG. 1.

FIG. 4 of the drawings is a graph showing sample values for the pressure correction value plotted as a function of measured mass air flow rate for a preferred air meter. If lookup table(s) is/are employed to generate the pressure correction term, the values for the table(s) may be generated to match empirical observations of the response of the air meter to be used. FIG. 5 of the drawings shows a preferred implementation of a multi-dimensional lookup table for storage of the pressure correction terms. In FIG. 5, the current MAF value $MAF_k$ and the prior MAF value $MAF_{k-1}$ are used as index values to retrieve a first intermediate pressure correction term from a first table 501. The first intermediate pressure correction term is then used in conjunction with the MAF value generated two routines previously ($MAF_{k-2}$) to retrieve a second intermediate pressure correction term from a second table 502. Depending upon how the response of the air meter is modelled, this procedure can be performed using only one table, or a number of tables in order to generate the pressure correction term $\Delta P_k$. Known interpolation techniques may be employed to generate a pressure correction term where no corresponding term is stored for the particular index values used for the table.

It is to be understood that the specific mechanisms and techniques which have been described are merely illustrative of one application of the principles of the invention. Numerous modifications may be made to the methods and apparatus described without departing from the true spirit and scope of the invention.

What is claimed is:

1. An electronic engine controller for use in a vehicle which employs an air meter to detect mass flow rate of air into an intake manifold of an engine, said controller comprising:

means for compensating for dynamic characteristics of said air meter comprising, means, responsive to a signal from said air meter, for generating a measured air flow value which is indicative of the mass flow rate of air entering the intake manifold;

means for generating a base pressure value as a function of said measured air flow value, said base pressure value being indicative of an air pressure in said intake manifold which corresponds to said measured air flow value; and means for generating a pressure correction value as a function of said measured air flow value, a prior measured air flow value, and a prior pressure correction value, said pressure correction value being indicative of a pressure correction required to compensate for errors introduced into said measured air flow value as a result of dynamic response of the air meter;

means, responsive to said base pressure value and to said pressure correction value, for generating a total pressure value which is indicative of the total pressure in the intake manifold; and means, responsive to said total pressure value, for generating a cylinder air charge value, indicative of air charge in cylinders of the engine, as a function of the rotational speed of the engine and a sampling interval which is indicative of a rate at which said measured air flow value is generated.

2. The electronic engine controller as set forth in claim 1 wherein the means for generating a total pressure value generates said total pressure value by adding said base pressure value to said pressure correction value.

3. The electronic engine controller set forth in claim 2 wherein the means for generating a pressure correction value comprises means for retrieving said pressure correction value from a table comprising a plurality of pressure correction values indexed by air flow.

4. The electronic engine controller set forth in claim 3 wherein the means for generating a base pressure value initializes said base pressure value to a value substantially equal to atmospheric pressure.

5. The electronic engine controller set forth in claim 3 wherein the means for generating a base pressure value initializes said base pressure value to a value substantially equal to atmospheric pressure.

6. The electronic engine controller set forth in claim 5 wherein the means for generating a cylinder air charge value generates said cylinder air charge value in accordance with the relationship:

$$CAC_k=\Delta t_k*Cyl(N_k,P_k)$$

where, $CAC_k$ is the cylinder air change value, $\Delta t_k$ is the sampling interval, $N_k$ is the rotational speed of the engine, $P_k$ is the total pressure value, and $Cyl(N_k, P_k)$ is a value indicative of the mass of air pumped into cylinders of said engine as a function of the rotational speed of the engine.

7. The electronic engine controller set forth in claim 5 wherein the means for generating a cylinder air charge value generates said cylinder air charge value in accordance with the relationship:

$$CAC_k=\Delta t_k*Cyl(N_k,P_k)$$

where, $CAC_k$ is the cylinder air change value, $\Delta t_k$ is the sampling interval, $N_k$ is the rotational speed of the engine, $P_k$ is the total pressure value, and $Cyl(N_k, P_k)$ is a value indicative of the mass of air pumped into cylinders of said engine as a function of the rotational speed of the engine.

8. The electronic engine controller set forth in claim 1 wherein the means for generating a pressure correction value comprises means for retrieving said pressure correction value from a table comprising a plurality of pressure correction values indexed by air flow.

9. A method of compensating for dynamic characteristics of an air meter which is positioned to detect the amount of air entering an intake manifold of an internal combustion engine, the method comprising the steps of:

(i) generating, in response to an air flow signal from said air meter, a mass air flow value which is indicative of the mass of air entering said intake manifold;

(ii) determining a mass correction value as a function of said mass air flow value, at least one prior mass air flow value which is indicative of the amount of air entering said intake manifold at a time prior to generation of said mass air flow value, and as a function of a prior mass correction value, said mass correction value compensating for errors introduced into generation of said mass air flow value due to dynamic characteristics of said air meter;

(iii) generating an intermediate mass air flow value by multiplying said mass air flow value by a sampling interval value;

(iv) determining an intermediate mass charge value as a function of said mass correction value and said intermediate mass air flow value;

(v) determining a base mass air charge value, which is indicative of the proportion of the actual cylinder air charge reflected in the mass air flow value, as a function of a prior cylinder air charge value, said sampling interval value, the rotational speed of the engine and the air temperature in the intake manifold;

(vi) determining a cylinder air charge value, which is indicative of air charge in cylinders of the engine, as a function of said base mass air charge value, said prior cylinder air charge value and said intermediate mass charge value; and (v) periodically repeating steps (i) through (vi) at intervals substantially equal to said sampling interval value.

10. The method as set forth in claim 9 wherein the step of determining a mass correction value comprises the additional step of determining said mass correction value as a function of at least one prior mass air flow value which is indicative of the amount of air entering said intake manifold at a time prior to generation of said mass air flow value.

11. An article of manufacture comprising:

a computer storage medium having a computer program encoded therein for causing a computer to control the ratio of air and fuel which is combusted by an engine and for compensating for dynamic characteristics of an air meter employed by said engine to detect the mass flow rate of air into an intake manifold of said engine, said computer storage medium comprising, means, responsive to a signal generated by said air meter, for causing the computer to generate a measured air flow value which is indicative of the mass flow rate of air entering the intake manifold;

means for causing said computer to generate a base pressure value as a function of said measured air flow value, said base pressure value being indicative of an air pressure in said intake manifold which corresponds to said measured air flow value;

means for causing said computer to generate a pressure correction value as a function of said measured air flow value, a prior measured air flow value, and a prior pressure correction value, said pressure correction value being indicative of a pressure correction required to compensate for dynamic response of the air meter;

means, responsive to said base pressure value and to said pressure correction value, for causing said computer to generate a total pressure value which is indicative of the total pressure in the intake manifold; and means, responsive to said total pressure value, for causing said computer to generate a cylinder air charge value, indicative of air charge in cylinders of the engine, as a function of the rotational speed of the engine and a sampling interval which is indicative of a rate at which said measured air flow value is generated.

12. An article of manufacture as set forth in claim 11 wherein the total pressure value is generated by adding said base pressure value to said pressure correction value.

13. An article of manufacture as set forth in claim 12 wherein the means for causing said computer to generate said pressure correction value comprises means for retrieving said pressure correction value from a table comprising a plurality of correction values indexed by air flow.

14. An article of manufacture as set forth in claim 11 wherein the means for causing said computer to generate said base pressure value initializes said base pressure value to a value substantially equal to atmospheric pressure.

15. An article of manufacture as set forth in claim 14 wherein the means for causing said computer to generate said cylinder air charge value generates said cylinder air charge value in accordance with the relationship:

$$CAC_k=\Delta t_k * Cyl(N_k,P_k)$$

where, $CAC_k$ is the cylinder air charge value, $\Delta t_k$ is the sampling interval, $N_k$ is the rotational speed of the engine, $P_k$ is the total pressure value, and $Cyl(N_k, P_k)$ is a value indicative of the mass of air pumped into cylinders of said engine as a function of the rotational speed of the engine.

* * * * *